(12) United States Patent
Hope (10) Patent No.: US 9,154,180 B2
(45) Date of Patent: Oct. 6, 2015

(54) SIGNAL CONDITIONER FOR BI-DIRECTIONAL RADIO FREQUENCY SIGNALS IN A TELECOMMUNICATIONS NETWORK

(71) Applicant: Thomason Broadband Supply, Spartanburg, SC (US)

(72) Inventor: Christian Hope, Spartanburg, SC (US)

(73) Assignee: Thomason Broadband Supply, Spartanburg, SC (US)

( * ) Notice: Subject to any disclaimer, the term of this patent is extended or adjusted under 35 U.S.C. 154(b) by 84 days.

(21) Appl. No.: 14/200,857

(22) Filed: Mar. 7, 2014

(65) Prior Publication Data

US 2015/0256215 A1  Sep. 10, 2015

(51) Int. Cl.
*H04L 5/00* (2006.01)
*H04B 1/525* (2015.01)
*H04J 1/08* (2006.01)
*H04L 5/14* (2006.01)
*H04B 3/46* (2015.01)

(52) U.S. Cl.
CPC .................. *H04B 1/525* (2013.01); *H04B 3/46* (2013.01); *H04J 1/08* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 6,006,066 A * | 12/1999 | Krimmel | 725/125 |
| 8,154,361 B2 | 4/2012 | Magin | |
| 8,464,301 B2 | 6/2013 | Olson et al. | |
| 8,487,717 B2 | 7/2013 | Alkan et al. | |
| 8,516,537 B2 | 8/2013 | Kelma et al. | |
| 8,584,192 B2 | 11/2013 | Palinkas et al. | |
| 9,014,571 B2 * | 4/2015 | Khalouf et al. | 398/193 |
| 2007/0061861 A1 * | 3/2007 | Strull et al. | 725/118 |
| 2009/0041106 A1 * | 2/2009 | Perez et al. | 375/229 |
| 2009/0133095 A1 * | 5/2009 | Phillips et al. | 725/149 |
| 2009/0219117 A1 * | 9/2009 | Colussi et al. | 333/28 |
| 2011/0318012 A1 * | 12/2011 | Lonn | 398/115 |
| 2013/0342272 A1 * | 12/2013 | Riggsby et al. | 330/185 |
| 2013/0343245 A1 * | 12/2013 | Li et al. | 370/297 |

OTHER PUBLICATIONS

1 GHz Feederline Equalizer FFE-*-100*/RP-R Catalog Sheet—5 pages, 2003.
Advanced System Design Product Specifications—FFE-8-**S/RP Feederline Eqaulizer—1 page, 2008.
Arris, FFE-*-100*/RP-R 1GHZ Feederline Eqaulizer—4 pages, 2014.

* cited by examiner

*Primary Examiner* — Anh-Vu Ly
(74) *Attorney, Agent, or Firm* — Dority & Manning, P.A.

(57) ABSTRACT

A signal conditioning device for conditioning bi-directional radiofrequency (RF) signals in a telecommunications network are provided. The signal conditioning device can allow for the separate conditioning of both downstream and upstream signals in a telecommunication system using a single signal conditioning device disposed at a single location. The signal conditioning device can include first and second line connections and can divide a bi-directional communication signal into downstream and upstream signals. The signal conditioning device can independently condition the downstream and upstream signals using plug-in signal conditioning circuits received into external plug-in sockets.

19 Claims, 6 Drawing Sheets

SIGNAL CONDITIONER FOR BI-DIRECTIONAL RADIO FREQUENCY SIGNALS IN A TELECOMMUNICATIONS NETWORK

FIELD

The present disclosure relates generally to telecommunications networks, and more particularly, to conditioning bi-directional radio frequency (RF) signals communicated over a coaxial cable portion of a telecommunications network.

BACKGROUND

Telecommunications networks, such as networks used by cable television, telephone, and internet services, can provide for communication of information using bi-directional radiofrequency (RF) signals, including a downstream signal (e.g. a forward signal) and an upstream signal (e.g. a return signal). The downstream signal can carry information from a service provider's headend to a user device at a user's location or premises. The upstream signal can carry information from the user device to the service provider's headend. To reduce interference, the downstream signal and the upstream signal can be associated with different frequency bands. For instance, the downstream signal can be associated with a first frequency band having a bandwidth from 54 MHz to 1,000 MHz while an upstream signal can be associated with a second frequency band having a bandwidth from 5 MHz to 42 MHz.

Telecommunications networks can communicate RF signals over coaxial cables. For instance, a telecommunications network can include a hybrid fiber-coaxial network that uses both optical fiber and coaxial cable. For instance, an optically modulated signal can be transmitted from a service provider's headend via an optical cable. A fiber optic node can receive the optically modulated signal and convert the optically modulated signal to an RF modulated signal. The RF modulated signal can be communicated to various locations using, for instance, coaxial cable. The coaxial cable portion of the telecommunications network can involve a trunk and branch configuration, with amplifiers provided at intervals to overcome attenuation and passive losses of the RF modulated signal. For example, a coaxial cable distribution line can be tapped to create individual "drop lines" to a user's location or premises.

SUMMARY

Aspects and advantages of embodiments of the present disclosure will be set forth in part in the following description, or may be learned from the description, or may be learned through practice of the embodiments.

One example aspect of the present disclosure is directed to a signal conditioning device for a telecommunications network. The signal conditioning device can include a housing, a first line connection, and a second line connection. The first line connection and the second line connection are capable of connecting to a coaxial cable configured to accommodate a bi-directional radio frequency communication signal. The signal conditioning device further includes a first signal path coupled between the first line connection and the second line connection. The first signal path is capable of communicating a first frequency band signal between the first line connection and the second line connection. The signal conditioning device further includes a second signal path coupled between the first line connection and the second line connection. The second signal path is capable of communicating a second frequency band signal between the first line connection and the second line connection. The signal conditioning device further includes a first plug-in socket accessible on an exterior surface of the housing and coupled to the first signal path. The first plug-in socket is capable of receiving a first plug-in signal conditioner circuit configured to condition the first frequency band signal. The signal conditioning device further includes a second plug-in socket accessible on an exterior surface of the housing and coupled to the second signal path. The second plug-in socket is capable of receiving a second plug-in signal conditioner circuit configured to condition the second frequency band signal.

Other example aspects of the present disclosure are directed to systems, methods, apparatus, and devices for conditioning bi-directional radio frequency signals in a telecommunications network, such as a coaxial cable portion of a telecommunications network.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, example aspects of the present disclosure are directed to conditioning bi-directional radiofrequency (RF) signals in a coaxial cable portion of a telecommunications network, such as telecommunications network associated with a cable television, phone, or internet service. Coaxial distribution lines associated with telecommunications networks can be tapped to create individual drop lines to a user's location or premises. Depending on the length of the coaxial drop line and other factors, the strength of downstream (e.g. forward) and/or upstream (e.g. return) signals may vary across their respective bandwidths. In general, however, factors that cause signal strength to vary do not affect the downstream signal and the upstream signal in the same manner. For example, the upper frequencies associated with the downstream signal may be attenuated at a particular user's location while there may be no significant effect on the upstream signal. Attempts have been made to correct for variations in signal strength over a telecommunications network using line conditioners, such as in-line equalizers, attenuators, etc. However, existing solutions for conditioning coaxial drop lines can require separate line conditioners for the downstream signal and the upstream signal disposed at different locations along the coaxial drop line.

According to example aspects of the present disclosure, a signal conditioning device is provided that can allow for the separate conditioning of both downstream and upstream signals in a coaxial RF telecommunication system using a single signal conditioning device disposed at a single location along a coaxial cable, such as a coaxial drop line. The signal conditioning device can include first and second line connections, such as coaxial F connections, that are capable of being coupled to the coaxial cable. The signal conditioning device can include a plurality of devices (e.g. diplexers) to multiplex a bi-directional RF communication signal received at the signal conditioning device into a first frequency band signal (e.g. the forward or downstream signal) and a second frequency band signal (e.g. the return or upstream signal).

The first frequency band signal can be communicated between the first and second line connections of the signal conditioning device using a first signal path. The second frequency band signal can be communicated between the first and second line connections of the signal conditioning device using a second signal path. The signal conditioning device can include a first plug-in socket (e.g. a JXP style plug-in socket) coupled to the first signal path and a second plug-in socket (e.g. a JXP style plug-in socket) coupled to the second signal path.

The first and second plug-in sockets can provide for the independent conditioning of the first frequency band signal and the second frequency band signal. For instance, a first plug-in signal conditioner circuit (e.g. a passive conditioning circuit) can be received into the first plug-in socket and a second plug-in signal conditioner circuit (e.g. a passive conditioning circuit) can be received into the second plug-in socket. The first plug-in signal conditioner circuit and the second plug-in signal conditioner circuit can be JXP style plug-in conditioner circuits configured to provide one or more of a variety of signal conditioning effects. For instance, the first plug-in signal conditioning and/or the second plug-in signal conditioner circuit can be an attenuator, an equalizer, a cable simulator, a bridge, or other signal conditioner circuit.

The first signal conditioner circuit can condition the first frequency band signal independently of the second frequency band signal. Similarly, the second signal conditioner circuit can condition the second frequency band signal independently of the first frequency band signal. In this way, the signal conditioning device can provide for the independent conditioning of both the downstream and upstream signals using a single device disposed at a single location in a telecommunications system.

The signal conditioning device according to example aspects of the present disclosure can be useful for many purposes. For instance, in one example application, the signal conditioning device can be used to independently condition both the downstream and upstream signals in a drop line of a telecommunications system. In another example application, the signal conditioning device can be used to condition the downstream and upstream signals between a coaxial distribution line and signal monitoring equipment, such as a model used for status monitoring in power supply locations.

According to particular aspects of the present disclosure, the first and second plug-in sockets can be accessible on an exterior surface of a housing associated with the signal conditioning device. As a result, a user or technician can easily install and/or replace various signal conditioning circuits for both the downstream and the upstream signal at a single location, providing an easy-to-use, customizable tool for conditioning signals in a telecommunications system. For example, a technician can determine at a particular location on a coaxial cable, such as at a drop line to a user's premises, that the downstream signal is need of an equalizer while the upstream signal requires attenuation. In this example, the technician can provide a plug-in equalizer in the first external plug-in socket to condition the downstream signal. The technician can provide a plug-in attenuator in the second external plug-in socket to attenuate the upstream signal. The technician can provide varying levels of attenuation/equalization by selecting and/or replacing the particular signal conditioning circuits provided into the external plug-in sockets. Other suitable combinations of signal conditioning can be provided without deviating from the scope of the present disclosure.

Figure 1:
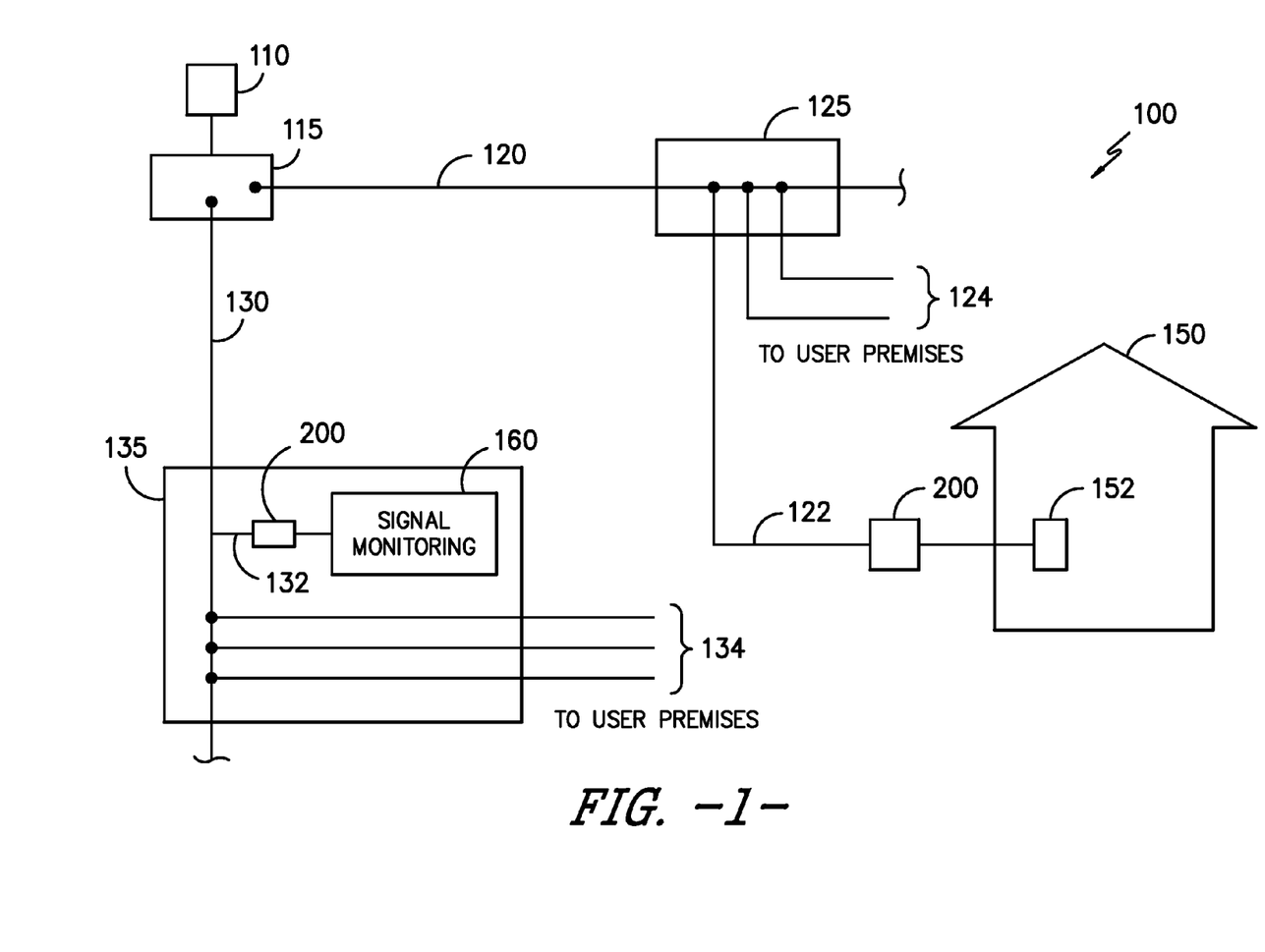
FIG. 1 depicts an example telecommunications system according to example embodiments of the present disclosure.

With reference now to the FIGS., example embodiments of the present disclosure will now be discussed in detail. FIG. 1 depicts an example telecommunications system 100 according to an example embodiment of the present disclosure. The telecommunications system 100 is a hybrid fiber-coaxial telecommunication system. Example aspects of the present disclosure are discussed with reference to a hybrid fiber-coaxial telecommunications system for purposes of illustration and discussion. Those of ordinary skill in the art, using the disclosures provided herein, will understand that the signal conditioning device according to example embodiments of the present disclosure can be used with other suitable telecommunications systems, such as purely optical and/or purely coaxial based telecommunication systems.

The telecommunications system 100 includes a headend 110 associated with a service provider (e.g. cable television or internet service provider) that can provide information using an optically modulated signal to an optical node 115 via, for instance, a fiber connection. The optical node 115 can convert the optically modulated signal into an RF modulated signal. The RF modulated signal can be a bi-directional telecommunications signal that includes components of both a first frequency band signal and a second frequency band signal. The first frequency band signal can be a downstream (e.g. forward) signal and the second frequency band signal can be an upstream (e.g. return) signal.

The telecommunication signal can be communicated over a coaxial cable portion of the telecommunications system 100, such as over coaxial distribution line 120 and coaxial distribution line 130. The coaxial distribution lines 120 and 130 can include amplifiers and other signal conditioning devices to condition the telecommunication signal communicated over the coaxial distribution lines 120 and 130. Other coaxial distribution lines can be provided from the optical node 115 without deviating from the scope of the present disclosure.

Coaxial distribution line 120 can carry the telecommunication signal over a distance to a service location 125. The service location 125 can be a location where the coaxial distribution line 120 can be tapped to provide individual drop lines to various loads, such as to a user premises (e.g. a house, apartment building, business location, etc.). The coaxial distribution line 120 can be tapped at other locations along the distribution line 120. The service location 125 can include various devices for attenuating, amplifying, or otherwise conditioning the RF modulated signal carried over the coaxial distribution line 120.

As shown in FIG. 1, coaxial distribution line 120 is tapped multiple times at service location 125 to create individual drop lines, such as drop line 122 and drop lines 124. Drop line 122 can carry the telecommunication signal to a user's premises 150, such as to a user device 152 (e.g. a cable modem, cable box, etc.) at the user's premises 150. Drop lines 124 can carry telecommunications signals to other premises or locales in the vicinity of the service location 125.

A signal conditioning device 200 according to example aspects of the present disclosure can be coupled to drop line 122. The signal conditioning device 200 can be configured to independently condition both the upstream and the downstream portion of the bi-directional telecommunication signal at a single location on the drop line 122, such as at or near the user premises 150. Details concerning an example signal conditioning device 200 will be discussed in more detail below.

Coaxial distribution line 130 can communicate the telecommunication signal over a distance to service location 135. The service location 135 can be a location where the coaxial distribution line 130 can be tapped to provide individual drop lines to various loads, such as to a user premises (e.g. a house, apartment building, business location, etc.). The coaxial distribution line 130 can be tapped at other locations along the distribution line 130. The coaxial distribution line 130 is tapped multiple times at service location 135 to create individual drop lines 134 to various user premises.

The coaxial distribution line 130 has also been tapped to create a drop line 132 to signal monitoring equipment 160. Signal monitoring equipment 160 can be a modem (e.g. a DOC SIS modem) used to monitor various aspects of signal quality of the telecommunications system 100. As shown, a signal conditioning device 200 according to example aspects of the present disclosure is coupled to the drop line 132 to independently condition the upstream and downstream signals between the signal monitoring equipment 160 and the coaxial distribution line 130.

Figure 2:
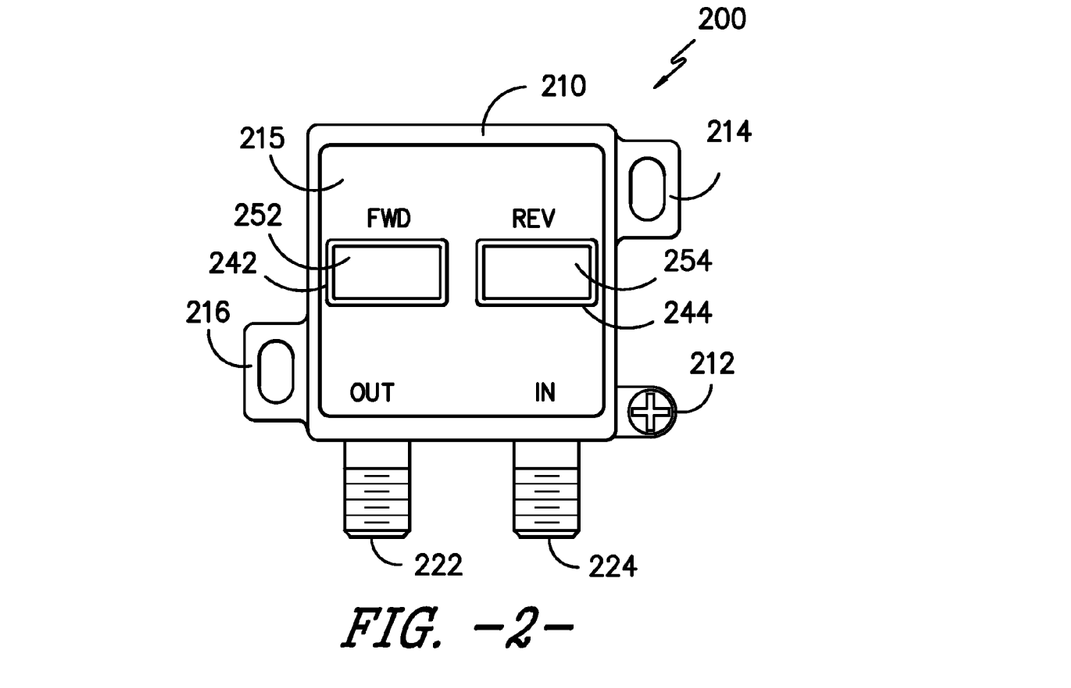
FIG. 2 depicts an example signal conditioning device according to example embodiments of the present disclosure.

FIG. 2 depicts an example signal conditioning device 200 according to example embodiments of the present disclosure. The signal conditioning device 200 can include a housing 210. The housing 210 can be formed from any suitable material, such as a metal material. In one implementation, the housing 210 is formed from a material suitable for shielding the telecommunication signals in the signal conditioning device 200. The housing 210 can include a mechanical interface 212 (such as a screw connection) that allows for removal of an external faceplate 215 of the housing 210 to gain access to the interior of the signal conditioning device 200. The housing 210 can further include brackets 214 and 216 for mounting the signal conditioning device 200.

As further illustrated in FIG. 2, the signal conditioning device 200 can include a first line connection 222 and a second line connection 224. The first line connection 222 and the second line connection 224 can be capable of connecting to a coaxial cable, such as a coaxial cable associated with a drop line of a telecommunication system. For example, the first line connection 222 and the second line connection 224 can be coaxial F connections.

Figure 3:
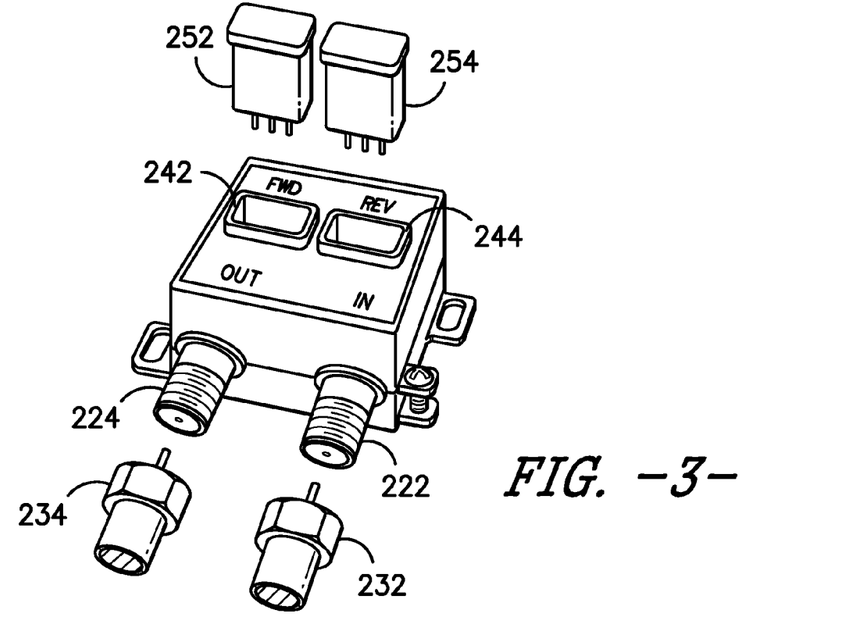
FIG. 3 depicts an perspective view of an example signal conditioning device according to example embodiments of the present disclosure.

FIG. 3 depicts the connection of the signal conditioning device 200 to a coaxial cable, such as a drop line. More particularly, a first coaxial cable 232 can be coupled to the first line connection 222. The external faceplate 215 of the housing 210 can include indicia indicating that the "IN" cable connection is provided at the first line connection 222. A second coaxial cable 234 can be coupled to the second line connection 224. The external faceplate 215 of the housing 210 can include indicia indicating that the "OUT" cable connection is provided at the second line connection 222. While the present disclosure refers to "IN" and "OUT" connections to the signal conditioning device 200, those of ordinary skill in the art, using the disclosures provided herein, will understand that the nature of bi-directional telecommunication signals can allow for both "IN" and "OUT" connections to act as an input and/or output of the signal conditioning device 200.

Referring back to FIG. 2, the signal conditioning device 200 can include a first plug-in socket 242 and a second plug-in socket 244 accessible on an exterior surface of the housing 210. More particularly, the first plug-in socket 242 and the second plug-in socket 244 are arranged adjacent to one another on the external faceplate 215 of the housing 210. The first plug-in socket 242 and the second plug-in socket 244 can each be configured to receive a plug-in signal conditioner circuit, such as a passive three-prong plug-in signal conditioner circuit. For instance, the first plug-in socket 242 and the second plug-in socket can be JXP style plug-in sockets adapted to receive JXP style plug-in signal conditioner circuits.

A first plug-in signal conditioner circuit 252 can be received or plugged into the first plug-in socket 242. The first plug-in conditioner circuit 252 can be one of a plug-in attenuator, equalizer, cable simulator, bridge, or other signal conditioning device. A second plug-in signal conditioner circuit 254 can be received into the second plug-in socket 244. The second plug-in conditioner circuit 254 can be one of a plug-in attenuator, equalizer, cable simulator, bridge or other signal conditioning device. The second plug-in conditioner circuit 254 can be the same type of signal conditioning circuit or a different type of conditioning circuit relative to the first plug-in conditioner circuit 252.

As shown in FIG. 3, the first plug-in conditioner circuit 252 can be selectively plugged into and removed from the first plug-in socket 242. The second plug-in conditioner circuit 254 can be selectively plugged into and removed from the second plug-in socket 244. The first plug-in conditioner circuit 252, when received into the first plug-in socket 242, can be configured to independently condition a first frequency band signal (e.g. a downstream signal). The second plug-in conditioner circuit 254, when received into the second plug-in socket 244, can be configured to independently condition a second frequency band signal (e.g. an upstream signal).

As shown in FIG. 2, the external face plate 215 can include indicia (e.g. FWD) associated with the first plug-in socket 242 indicating that the first plug-in socket 242 is for receiving a plug-in conditioner circuit for conditioning the forward or downstream signal. The external face plate 215 can also include indicia (e.g. REV) associated with the second plug-in socket 244 indicating that the second plug-in socket is for receiving a plug-in conditioner circuit for conditioning the return or upstream signal. Because the first and second plug-in sockets 242 and 244 are accessible from an exterior surface of the housing 210, a technician or other user can easily select and change out signal conditioner circuits for conditioning the bi-directional telecommunication signal as appropriate.

Figure 4:
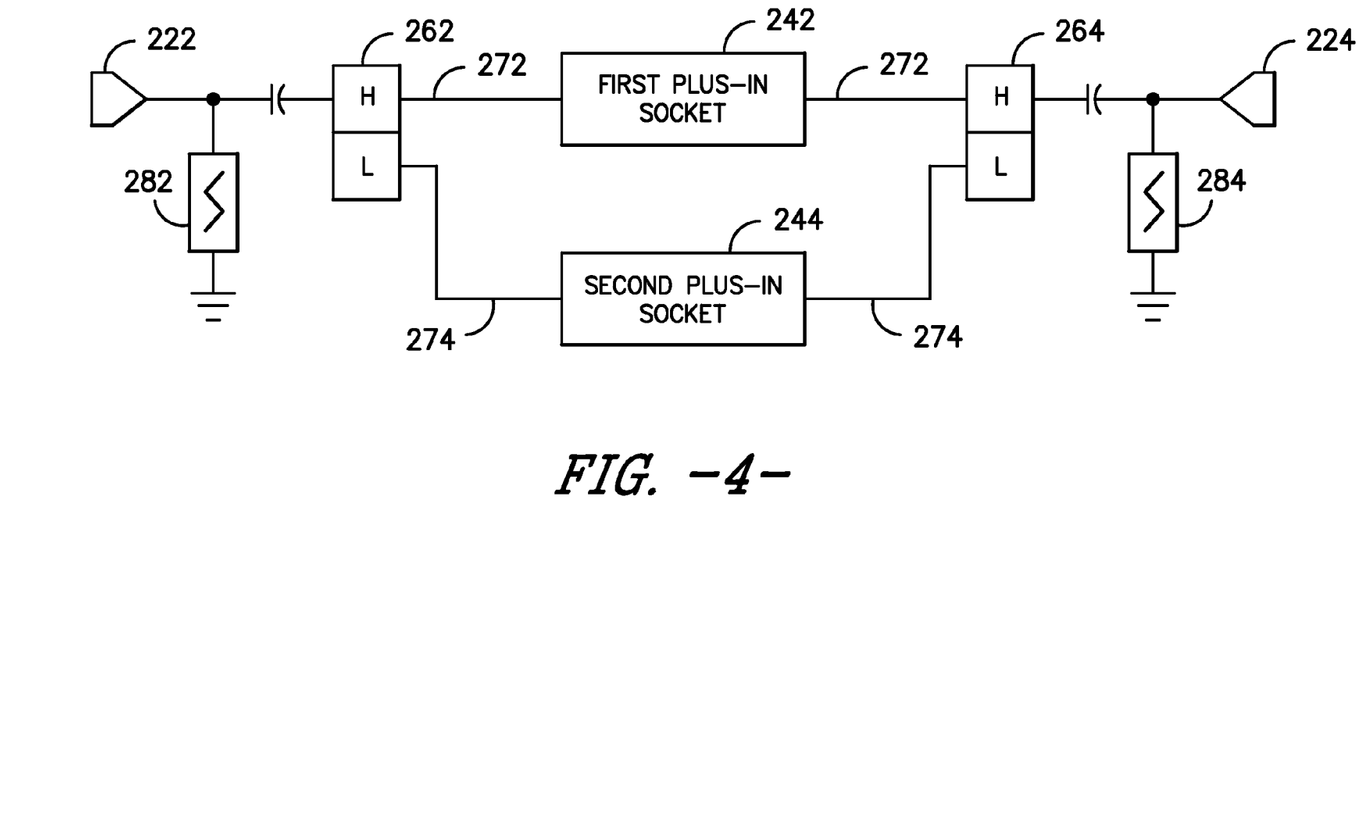
FIG. 4 depicts a circuit diagram associated with an example signal conditioning device according to example embodiments of the present disclosure.

FIG. 4 depicts an example circuit diagram for the signal conditioning device 200 according to example aspects of the present disclosure. The signal conditioning device 200 includes a first line connection 222 and a second line connection 224. Surge protection circuits 282 and 284 can be included in the signal conditioning device 200 to provide surge protection capabilities. The signal conditioning device 200 includes a first multiplexer 262 (e.g. a first diplexer) configured to multiplex a bi-directional communication signal received at the first line connection 222 into the first frequency band signal (e.g. the downstream signal) and the second frequency band signal (e.g. the upstream signal). The first frequency band signal can have associated with a different frequency band than the second frequency band signal. For instance, the first frequency band signal can have a bandwidth of about 54 MHz to about 1000 MHz and the second frequency band signal has a bandwidth of about 5 MHz to about 40 MHz. As used herein, the term "about" when used in reference to a value is intended to refer to within 20% of the specified value. The signal conditioner device 200 further includes a second multiplexer (e.g. a second diplexer) configured to multiplex the first frequency band signal and the second frequency band signal into the bi-directional communication signal received at line connection 224.

The first frequency band signal is communicated over a first signal path 272 coupled between the first line connection 222 and the second line connection 224. The first plug-in socket 242 is coupled to the first signal path 272. As discussed above, the first plug-in socket 242 can receive a first plug-in signal conditioner circuit (e.g. an equalizer, attenuator, cable simulator, bridge, etc.) configured to condition the first frequency band signal communicated over the first signal path 272. The second frequency band signal is communicated over a second signal path 274 coupled between the first line connection 222 and the second line connection 224. The second plug-in socket 244 is coupled to the second signal path 274. The second plug-in socket 244 can receive a second plug-in signal conditioner circuit (e.g. an equalizer, attenuator, cable simulator, bridge, etc.) configured to condition the second frequency band signal communicated over the second signal path 274. In this way, the signal conditioning device 200 can be configured to condition the first frequency band signal independently of the second frequency band signal and can be configured to condition the second frequency band signal independently of the first frequency band signal.

Figure 5:
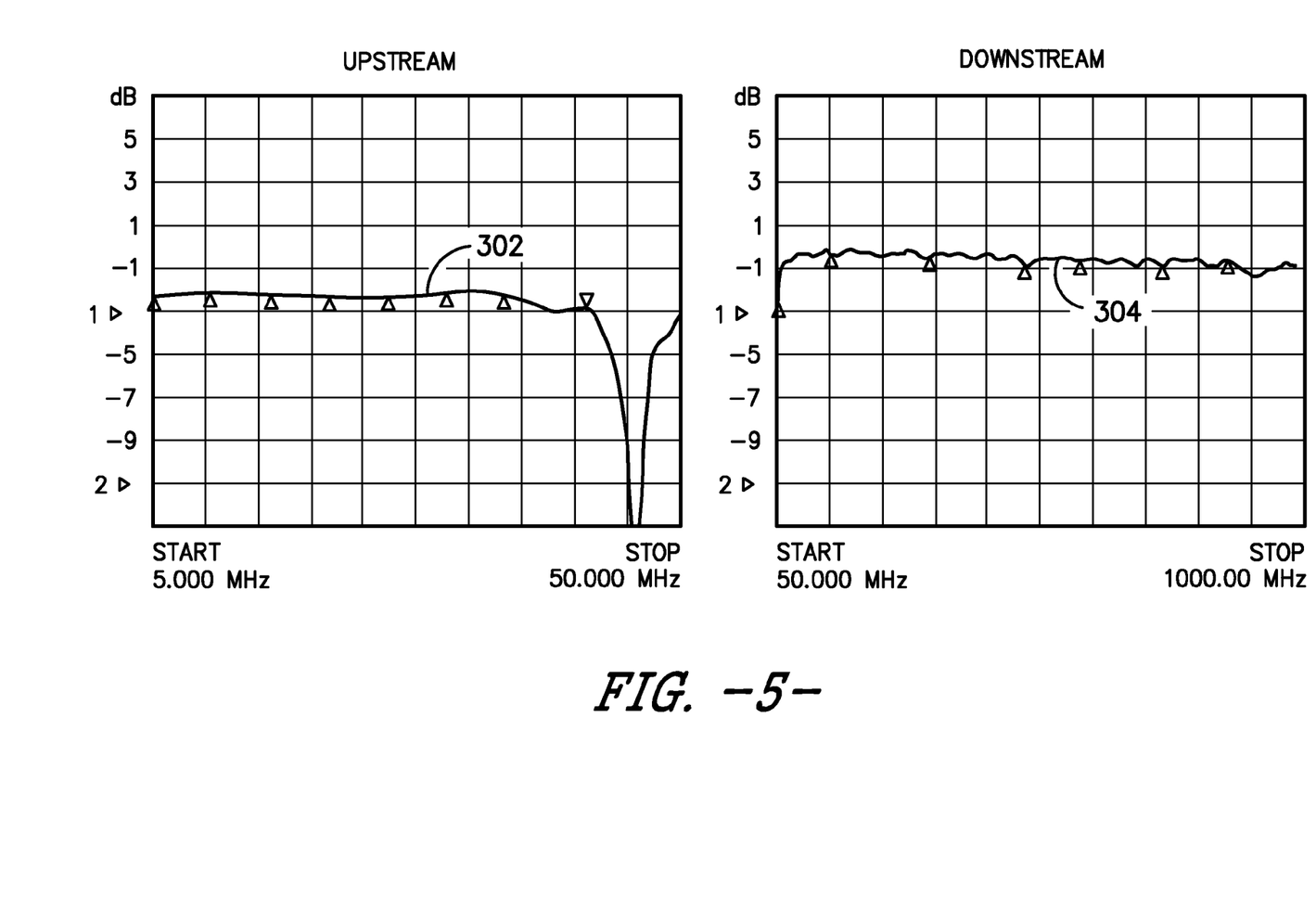
FIGS. 5 and 6 depict independent signal conditioning of an upstream signal and a downstream signal using an example signal conditioning device according to example aspects of the present disclosure.
Figure 6:
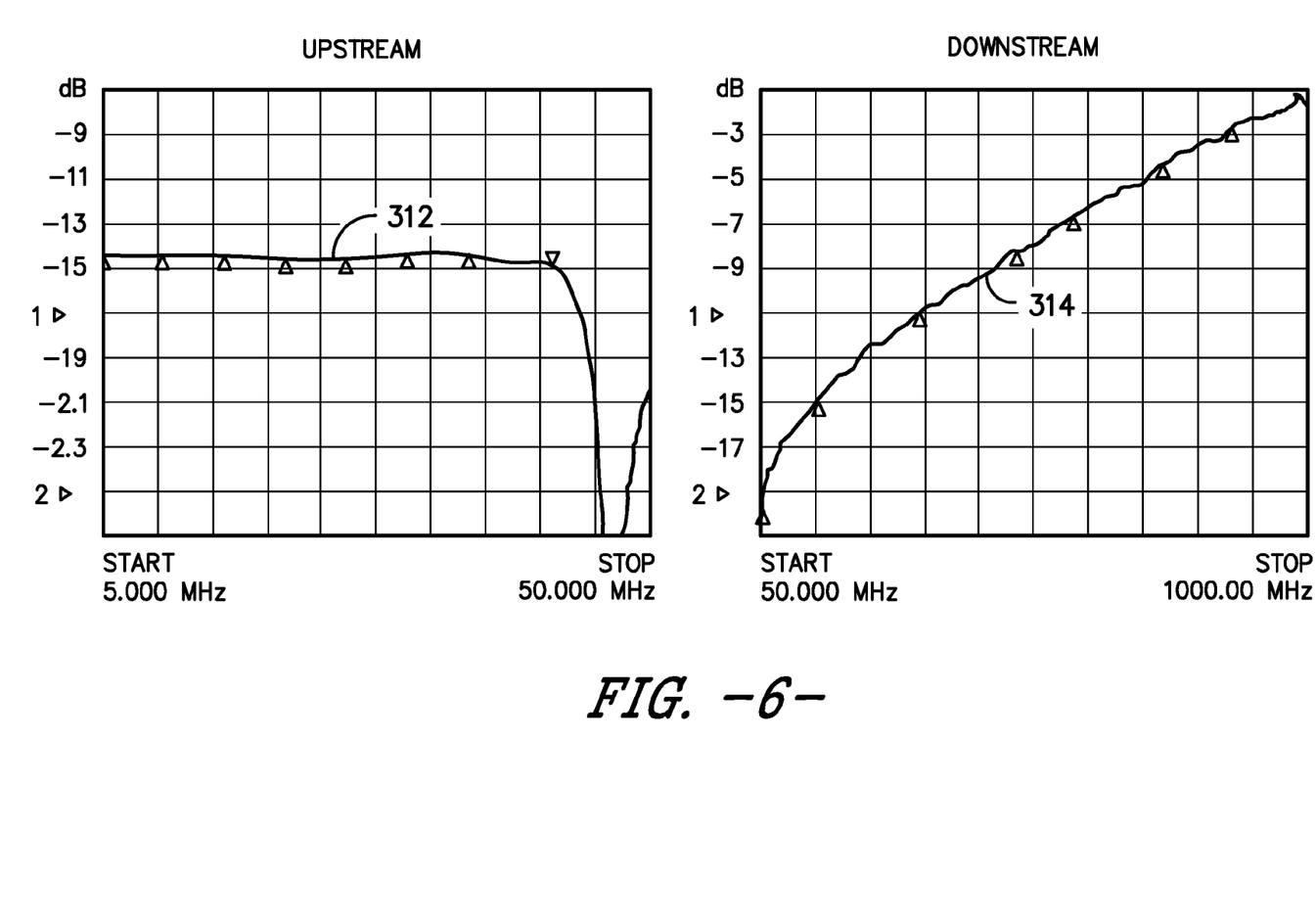

FIGS. 5 and 6 illustrate the independent conditioning of a first frequency band signal and a second frequency band signal using a signal conditioning device according to example embodiments of the present disclosure. More particularly, FIG. 5 provides a graphical representation of an example upstream signal 302 and a downstream signal 304 with no signal conditioning. FIG. 5 plots frequency along the abscissa in MHz and signal strength in dB along the ordinate. As shown, the upstream signal 302 has a bandwidth of about 5 MHz to about 40 MHz. The downstream signal 304 has a bandwidth of about 50 MHz to about 1000 MHz.

FIG. 6 provides a graphical representation of an example upstream signal 312 after being conditioned by a 12 dB attenuator pad plugged into the plug-in socket associated with the upstream signal of a signal conditioning device according to example embodiments of the present disclosure. FIG. 6 further depicts a graphical representation of an example downstream signal 314 after being conditioned by a 18 dB Forward 1 GHz equalizer plugged into the plug-in socket associated with the downstream signal of the signal conditioning device according to example embodiments of the present disclosure. FIG. 6 plots frequency along the abscissa in MHz and signal strength in dB along the ordinate. As shown, the signal conditioning device can provide for the independent conditioning of both the upstream signal 312 and the downstream signal 314.

Figure 7:
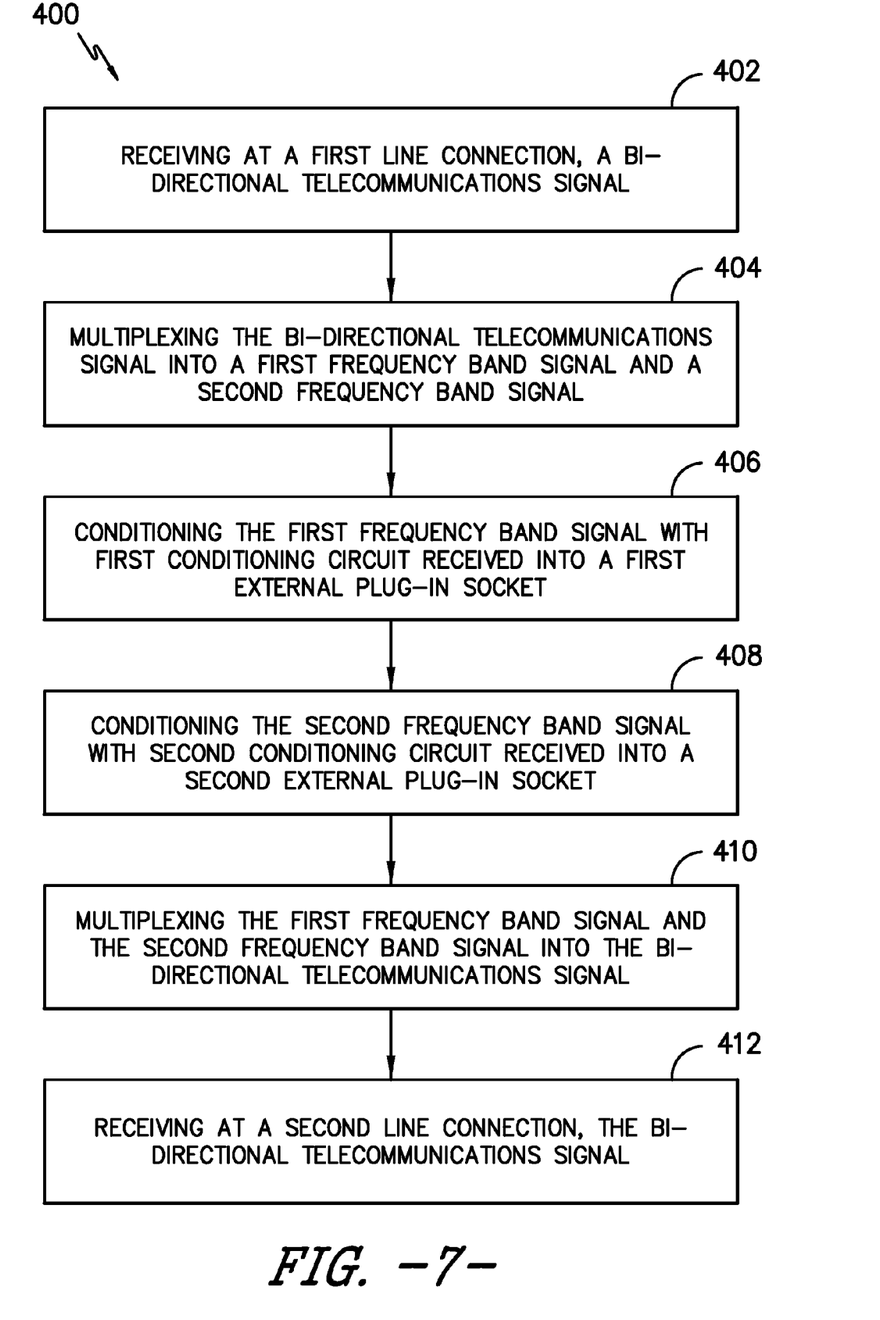
FIG. 7 depicts a flow diagram of an example method for conditioning a telecommunications signal according to example embodiments of the present disclosure.

FIG. 7 depicts a flow diagram of an example method (400) according to example aspects of the present disclosure. The method (400) can be implemented using the signal conditioning device 200 of FIGS. 2-4. In addition, FIG. 7 depicts steps performed in a particular order for purposes of illustration and discussion. Those of ordinary skill in the art, using the disclosures provided herein, will understand that various steps of any of the methods disclosed herein can be adapted, modified, expanded, omitted, and/or rearranged in various ways without deviating from the scope of the present disclosure.

At (402), the method includes receiving, at a first line connection of a signal conditioning device, a bi-directional communication signal. For instance, a bi-directional communication signal can be received at the first line connection 222 of FIG. 2. At (404) of FIG. 7, the bi-directional telecommunications signal can be multiplexed into a first frequency band signal and a second frequency band signal. For instance, the multiplexer 262 of FIG. 4 can multiplex a bi-directional telecommunication signal into a first frequency band signal for the first signal path 272 and a second frequency band signal for the second signal path 274.

At (406) of FIG. 7, the first frequency band signal is conditioned using a first plug-in conditioning circuit received into a first external plug-in socket. For instance, the first frequency band signal can be conditioned using the first plug-in signal conditioning circuit 252 plugged into the first plug-in socket 242 accessible from an exterior surface of the housing 210 of the signal conditioning device 200 of FIG. 2. The first frequency band signal can be conditioned using the first plug-in conditioning circuit in a variety of ways. For instance, the first frequency band signal can be conditioned using an attenuator, equalizer, cable simulator, bridge or other conditioning circuit.

At (408) of FIG. 7, the second frequency band signal is conditioned using a second plug-in conditioning circuit received into a second external plug-in socket. For instance, the second frequency band signal can be conditioned using the second plug-in signal conditioning circuit 254 plugged into the second plug-in socket 244 accessible from an exterior surface of the housing 210 of the signal conditioning device 200 of FIG. 2. The first frequency band signal can be conditioned using the second plug-in conditioning circuit in a variety of ways. For instance, the second frequency band signal can be conditioned using an attenuator, equalizer, cable simulator, bridge or other conditioning circuit.

At (410) of FIG. 7, the first frequency band signal and the second frequency band signal can be multiplexed into the bi-directional telecommunication signal. For instance, the multiplexer 264 (FIG. 4) can multiplex the first frequency band signal associated with the first signal path 272 and a second frequency band signal associated with the second signal path 274 into the bi-directional telecommunication signal. At (412) of FIG. 7, the method includes receiving, at a second line connection of a signal conditioning device, the bi-directional communication signal. For instance, the bi-directional communication signal can be received at the second line connection 224 of FIG. 2.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A signal conditioning device for a telecommunications network, comprising:
   a housing;
   a first line connection and a second line connection, the first line connection and the second line connection capable of connecting to a coaxial cable configured to accommodate a bi-directional radio frequency communication signal;
   a first signal path coupled between the first line connection and the second line connection, the first signal path capable of communicating a first frequency band signal between the first line connection and the second line connection;
   a second signal path coupled between the first line connection and the second line connection, the second signal path capable of communicating a second frequency band signal between the first line connection and the second line connection;
   a first plug-in socket accessible on an exterior surface of the housing and coupled to the first signal path, the first plug-in socket capable of receiving a first plug-in signal conditioner circuit configured to condition the first frequency band signal; and
   a second plug-in socket accessible on the exterior surface of the housing and coupled to the second signal path, the second plug-in socket capable of receiving a second plug-in signal conditioner circuit configured to condition the second frequency band signal.

2. The signal conditioning device of claim 1, further comprising:
   a first multiplexer configured to multiplex the bi-directional radio frequency communication signal received at the first line connection into the first frequency band signal and the second frequency band signal;
   a second multiplexer configured to multiplex the bi-directional radio frequency communication signal received at the second line connection into the first frequency band signal and the second frequency band signal.

3. The signal conditioning device of claim 1, wherein the first frequency band signal is a downstream telecommunications signal and the second frequency band signal is an upstream telecommunications signal.

4. The signal conditioning device of claim 3, wherein the first frequency band signal has a bandwidth of about 54 MHz to about 1000 MHz and the second frequency band signal has a bandwidth of about 5 MHz to about 40 MHz.

5. The signal conditioning device of claim 1, wherein the first and second line connections are coaxial F connectors.

6. The signal conditioning device of claim 1, wherein in the first and second plug-in sockets are JXP style plug-in sockets.

7. The signal conditioning device of claim 1, wherein the first and second plug-in sockets are arranged adjacent to one another on the external surface of the housing.

8. The signal conditioning device of claim 1, wherein the first plug-in signal conditioner circuit is received in the first plug-in socket and the second plug-in signal conditioner circuit is received in the second plug-in socket.

9. The signal conditioning device of claim 8, wherein the first plug-in signal conditioner circuit and the second-plug-in signal conditioner circuit are JXP style plug-in signal conditioner circuits.

10. The signal conditioning device of claim 8, wherein the first plug-in conditioner circuit is an attenuator, an equalizer, a cable simulator, or a bridge.

11. The signal conditioning device of claim 10, wherein the second plug-in signal conditioner circuit is an attenuator, an equalizer, a cable simulator, or a bridge.

12. The signal conditioning device of claim 11, wherein the first plug-in conditioner circuit is a different type of conditioner circuit than the second plug-in conditioner circuit.

13. A telecommunications system, comprising:
    a coaxial distribution line;
    a signal conditioning device comprising a first line connection and a second line connection, the signal conditioning device further comprising a first signal path for a first frequency band signal and a second signal path for a second frequency band signal;
    a first coaxial cable coupled between the coaxial distribution line and the first line connection of the signal conditioning device; and
    a second coaxial cable coupled to the second line connection of the signal conditioning device;
    wherein the signal conditioning device comprises a first plug-in signal conditioning circuit plugged into a first exterior plug-in socket coupled to the first signal path and a second plug-in signal conditioning circuit plugged into a second exterior plug-in socket coupled to the second signal path.

14. The telecommunications system of claim 13, wherein the first plug-in signal conditioning circuit is configured to condition the first frequency band signal independently of the second frequency band signal and the second plug-in conditioning circuit is configured to condition the second frequency band signal independently of the first frequency band signal.

15. The telecommunications system of claim 13, wherein the first coaxial cable and the second coaxial cable form at least a part of a coaxial drop line between the coaxial distribution cable and a user premises.

16. The telecommunications system of claim 13, wherein the second coaxial cable is coupled to a signal monitoring device.

17. The telecommunications system of claim 13, wherein the coaxial distribution line is coupled to a headend of a service provider of the telecommunications system.

18. A method for conditioning a telecommunications signal, comprising:
    receiving, at a first line connection of a signal conditioning device, a bi-directional telecommunications signal from a first coaxial cable;
    multiplexing, with a first multiplexer circuit, the bi-directional telecommunications signal into a first frequency band signal and a second frequency band signal;
    conditioning the first frequency band signal independently of the second frequency band signal with a first plug-in signal conditioning circuit received into a first plug-in socket accessible at an external surface of a housing associated with the signal conditioning device; and
    conditioning the second frequency band signal independently of the first frequency band signal into a second conditioned signal with a second plug-in signal conditioning circuit received into a plug-in socket accessible at the external surface of the housing of the signal conditioning device.

19. The method of claim 18, wherein the method further comprises:
  multiplexing, with a second multiplexer circuit, the first frequency band signal and the second frequency band signal into the bi-directional telecommunications signal; and
  receiving, at a second line connection of a signal conditioning device, the bi-directional telecommunications signal from a second coaxial cable.

* * * * *